United States Patent [19]

Lundell

[11] Patent Number: 4,976,341
[45] Date of Patent: Dec. 11, 1990

[54] SEGMENTED AUGER

[76] Inventor: Vance G. Lundell, R.R. 1, Box 27, Odebolt, Iowa 51458

[21] Appl. No.: 236,263

[22] Filed: Aug. 22, 1988

Related U.S. Application Data

[63] Continuation of Ser. No. 6,564, Jan. 22, 1987, abandoned.

[51] Int. Cl.$^5$ ............................................. B65G 33/32
[52] U.S. Cl. .................................................... 198/666
[58] Field of Search ......................... 198/664, 666, 676

[56] References Cited

U.S. PATENT DOCUMENTS

| | | | |
|---|---|---|---|
| 843,676 | 2/1907 | Gustavsen | 198/666 X |
| 2,308,075 | 1/1943 | Hahn | 198/666 |
| 2,443,288 | 6/1948 | Anderson | 198/666 |
| 3,178,210 | 4/1965 | Dickinson | 198/666 X |
| 3,187,882 | 6/1965 | Smith | 198/666 |
| 3,272,317 | 9/1966 | Kelly | 198/666 |
| 4,621,968 | 11/1986 | Hutchison | 198/666 X |
| 4,666,033 | 5/1987 | Reid | 198/664 |

FOREIGN PATENT DOCUMENTS 0024276 7/1972 Australia ............................ 198/666

Primary Examiner—Joseph E. Valenza
Assistant Examiner—Cheryl L. Gastineau
Attorney, Agent, or Firm—Kent A. Herink

[57] ABSTRACT

An auger assembled from a plurality of auger segments each of which includes a central longitudinal hollow hub with a longitudinal extension at each end of the hub. A section of helical flighting winds about the hub extending from the extension at one end of the hub to the extension at the other end. The end portions of the helical flighting are beveled to provide an acute edge and a supplementary obtuse edge of the flighting at each end portion. The auger segments have end-for-end symmetry and a plurality of segments are assembled in an end-to-end relationship about a main drive shaft to comprise the auger. When assembled to form the auger, the beveled end portions of adjacent segments overlap in a matching relationship to create a substantially smooth continuous helical flighting surface over the length of the auger. Similarly, the longitudinal extensions of adjacent augers join to create a substantially continuous outer periphery of the assembled hubs. The auger segments are made of an inert material, such as polyethylene, for use in conveying abrasive and corrosive materials.

11 Claims, 1 Drawing Sheet

U.S. Patent     Dec. 11, 1990     4,976,341
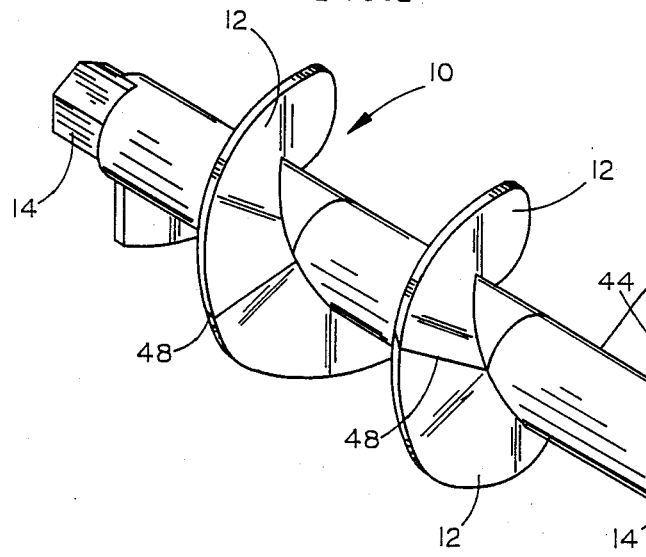
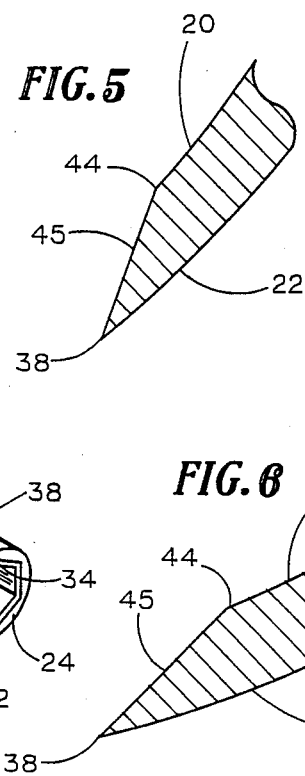
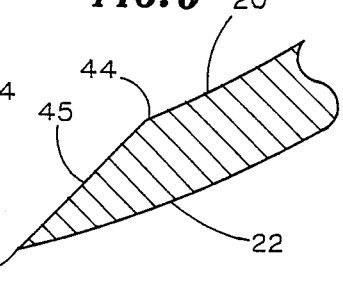
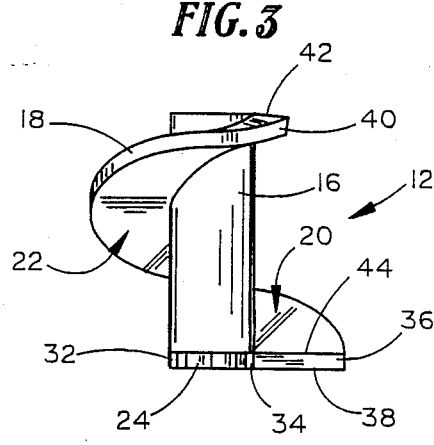
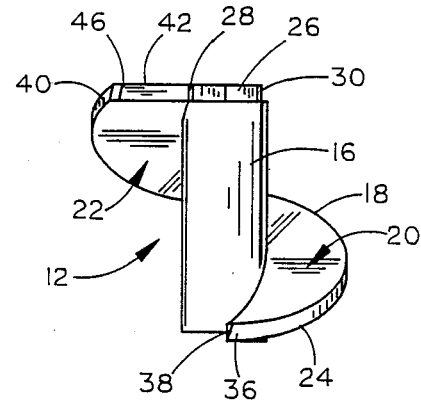
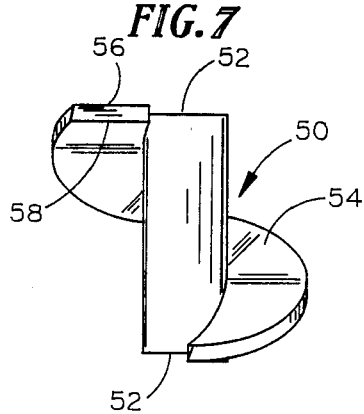
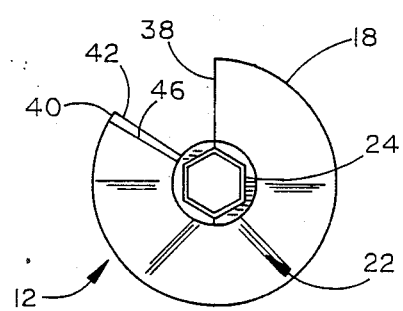

SEGMENTED AUGER

This application is a continuation of application Ser. No. 006,564, filed on Jan. 22, 1987, now abandoned.

BACKGROUND OF THE INVENTION

The invention is directed generally to an auger assembled from a plurality of auger segments and, more particularly, to a plurality of auger segments, each of which is made of an inert material and has end-for-end symmetry, assembled end-to-end about a drive shaft to comprise an auger.

Augers are widely used for the linear transport of fluids and fluid-like materials, such as water, sludge, sewage, grain, coal, and the like. Augers present a substantial surface area that comes into contact with the material being transported. Moreover, the rotational motion of the auger causes the exposed surfaces of the auger shaft and flighting to contact and be abraded by the transported material. The life of the auger, accordingly, is dependent upon the abrasion and corrosion resistant properties of the exposed surfaces of the auger. Augers having flighting and other exposed surfaces made of high-density plastics, such as polyethylene, have both excellent corrosion and abrasion resistances. One-piece augers made from such materials are known in the prior art.

Articles made from a high-density plastic like polyethylene are typically manufactured by plastic injection molding. This manufacturing process requires a specially constructed mold to be created for each length of auger to be constructed. The creation of such molds is an expensive capital cost of the injection molding process. The cost of augers produced by injection molding can be reduced by reducing the number of different molds required in the manufacturing process.

When damaged, conventional metal augers may be repaired by the reconstruction or replacement of damaged flighting by means of welding, brazing, or the like. Plastic augers, however, are not easily reconstructed or repaired and damage to a small section will frequently require the replacement of the entire auger length.

The auger segments of the present invention eliminate these problems by permitting the assembly of augers of discrete lengths by the use of the appropriate number of auger segments assembled on a main shaft in an end-to-end and mating relationship. The individual auger segments possess end-for-end symmetry and can be manufactured from a single plastic injection mold. If an auger constructed of these auger segments is damaged, the auger can be easily and economically repaired by the replacement of the auger segments that were damaged. Polyethylene augers constructed of auger segments of the present invention have been found to be economical of construction and long-lived when used in extremely corrosive and abrasive environments such as the handling of animal wastes and granular fertilizers.

SUMMARY OF THE INVENTION

The invention is an auger segment having a central tubular hub or longitudinal shaft about which is carried a section of helical flighting. The hub has an inner periphery that is non-circular in transverse cross section. Each end portion of the hub has a substantially semi-circular longitudinal extension including a pair of coplanar abutment surfaces at the free ends thereof. The end portions of the helical flighting are beveled, tapering to an edge which is along a radial line of the hub that includes the abutment surfaces. Each auger segment is symmetric about a central radial axis of the shaft so that they exhibit end-for-end symmetry.

The auger segments are assembled on a drive shaft which has a transverse cross section matching that of the inner periphery of the hollow shaft of each auger segment. The abutment surfaces of auger segments of an assembled auger will abut with the corresponding abutment surfaces of adjacent auger segments to provide a substantially continuous auger shaft enveloping the drive shaft of the auger. Similarly, beveled end portions of assembled auger segments match with the beveled end portions of adjacent auger segments creating lap joints to produce a substantially smooth and continuous surface of the helical flighting over the length of the auger.

BRIEF DESCRIPTION OF THE DRAWINGS

FIG. 1 is a perspective view of an auger assembled from a plurality of auger segments;

FIG. 2 is a front view of an auger segment;

FIG. 3 is a side view of the auger segment of FIG. 2;

FIG. 4 is an end view of the auger segment of FIG. 3;

FIG. 5 is an enlarged cross-sectional view of the helical flighting taken near the outer surface of the hub at the beveled end portion;

FIG. 6 is an enlarged cross-sectional view of the helical flighting taken near the outer periphery of the flighting at the beveled end portion; and FIG. 7 is a front view of a second preferred embodiment of the auger segment.

DETAILED DESCRIPTION OF A PREFERRED EMBODIMENT

With reference to FIG. 1, there is illustrated generally at 10 an auger assembled from a plurality of auger segments 12 placed in end-to-end abutting engagement about a main drive shaft 14. An individual auger segment 12 is illustrated in FIG. 2 and includes a central tubular hub 16 which is hollow, as illustrated in FIG. 4. The bore of the hub 16 of the auger segment 12 illustrated in the figures has an inner peripheral surface which defines a regular hexagon in transverse cross section, corresponding to the transverse cross-sectional shape of the main shaft 14. Any main shaft having a non-circular transverse cross section can be employed, however, provided that the inner peripheral surface of the hubs of the auger segments operatively correspond thereto. The tolerance between individual auger segments 12 and the main shaft 14 is close enough to permit insertion of the main shaft 14 but to resist effectively displacement of the interconnected segments during use.

A section of helical flighting 18 forms a part of each auger segment 12. The helical flighting 18 of the preferred embodiment is right-hand flighting or pitch; that is, rotation of the auger segment in the counterclockwise direction when viewed from one end of the auger segment 12 will act to convey material toward the opposite end of the auger segment 12. The helical flighting 18 could, of course, have opposite pitch, in which event rotation of a reverse-flighted auger segment in the clockwise direction when viewed from one end would act to convey material toward the opposite end of the auger segment. The helical flighting 18 of each auger segment 12 has two surfaces which, for the auger segment 12 illustrated in FIGS. 2-4, will be defined as upstream surface 20 and downstream surface 22.

Each end portion of the hub 16 has a substantially semicircular longitudinal extension 24 and 26 which serve to interconnect adjacent auger segments when assembled to form an auger 10 as illustrated in FIG. 1. Extension 26 includes a pair of abutment surfaces 28 and 30 (FIG. 2) and extension 24 includes a pair of abutment surfaces 32 and 34 (FIG. 3). The abutment surfaces consist of the free end portions of the longitudinal extensions of the hub 16. Each abutment surface lies in a longitudinal plane of the hub 16.

As is shown in FIG. 4, the helical flighting 18 of an auger segment 12 of the preferred embodiment extends about 5/6ths of a complete revolution (300 degrees) about hub 16. Accordingly, the longitudinal plane that includes abutment surfaces 28 and 30 is rotated 300 degrees from the plane that includes abutment surfaces 32 and 34.

The end portions of helical flighting 18 are beveled so that the flighting end portion 36, associated with extension 24, has a peripheral portion that terminates in an acute angle at acute edge 38 along downstream surface 22, as best shown in FIGS. 5 and 6. Acute edge 38 is defined by the intersection of downstream surface 22 with the outwardly facing or downstream surface of extension 24. Similarly, a flighting end portion 40 associated with extension 26 has a peripheral portion that terminates in an acute angle at acute edge 42 of upstream surface 20. Acute edge 42 is defined by the intersection of upstream surface 20 with the outwardly facing or upstream surface of extension 26. As best illustrated in FIG. 4, the acute edges 38 and 42 are also on radial lines of the hub 16.

Each end portion 36 and 40 also includes a peripheral portion that terminates in an obtuse edge, 44 and 46, respectively, that is supplementary to the acute edges. The obtuse edges 44 and 46 are also on radial lines of the hub 16 (FIG. 4) and are defined by the intersection of the upstream surface 20 and the downstream surface 22, respectively, with the plane defined by the corresponding nonextended end surface of hub 16. The beveled surface of each end portion, therefore, tapers from the obtuse edge to the acute edge. As is best illustrated in FIGS. 5 and 6, both the acute angle 38 and the obtuse angle 44 of the beveled face 45 between the acute edge 38 and obtuse edge 44 are constant along the radial extension of each end portion of the helical flighting. Because the slope of the surface of the helical flighting radially along an acute edge increases from the outer periphery of helical flighting 18 (FIG. 6) to its inner edge at the hub 16 (FIG. 5), the beveled face 45 between the obtuse edge and the acute edge twists with respect to the longitudinal axis of the auger segment 12 in the corresponding manner that surface of the helical flighting 18 twists when viewed radially.

This twisting of the beveled surface is illustrated in FIG. 1 on the beveled face between acute edge 38 and obtuse edge 44 and in the cross-sectional views of FIGS. 5 and 6. Note that the distance along the beveled face 45 from the acute edge to the obtuse edge increases from a minimum at the hub (FIG. 5) to a maximum at the outer periphery of the helical flighting (FIG. 6). This aspect is also illustrated in FIG. 4 and is a consequence of the acute and obtuse edges being along radial lines of the hub.

The auger segment 12 as described possesses end-for-end symmetry. In other words, the auger segment 12 is unchanged upon a 180° rotation about the central transverse radial axis that bisects the angle between acute edge 38 and acute edge 42 in FIG. 4.

When assembled end-to-end on a main shaft 14, as illustrated in FIG. 1, the abutment surfaces of adjacent auger segments 12 contact each other to provide a substantially continuous outer peripheral surface of the hubs of the assembled auger 10. Additionally, the beveled end portions of adjacent auger segments are supplementary so that the acute edges of the flighting of neighboring auger segments are adjacent to the obtuse edges of the adjacent auger section, thereby creating a flush lap joint, as illustrated in FIG. 1 at 48, wherein the beveled end portions of adjacent auger segments match to be in contact engagement along the full length of such end portions. The assembled auger 10 is thereby provided with a substantially smooth and continuous helical flighting surface for the conveyance of materials.

When viewed on end, the assembled auger 10 will convey material away from the viewer when rotated in the counterclockwise direction and will convey material toward the viewer when rotated in the clockwise direction. During operation in either direction, the helical flighting of the auger 10 will move relative to the material being conveyed such that the lap joints 48 of the beveled end portions will allow the conveyed material to move freely across the junction between adjacent auger segments 12. The force of this material on the upstream surface of the flighting further tends to keep the beveled end portions of adjacent auger segments in contact engagement. The direction of the bevel or taper thereby acts to prevent the material that is being conveyed from being forced between and separating the end portions of adjacent auger segments 12. This advantage of the assembled auger 10 is present irrespective of the direction of rotation of the auger 10.

The auger segments 12 of the preferred embodiment are manufactured by plastic injection molding out of high-density polyethylene. When used to convey granular fertilizer materials, polyethylene has an abrasion resistance equal to or better than that of a conventional steel auger and a corrosion resistance much superior to that of conventional steel.

In an alternative embodiment, illustrated in FIG. 7 generally at 50, the raised, half-annular sections are not present and the ends 52 of the shaft of the auger segments are flush. The flighting 54 of the alternative embodiment 50 extends beyond the end surface 52 of the shaft such that the plane of such end surface bisects the longitudinal distance between the acute edge 56 and the obtuse edge 58 at each end of the flighting. Auger segments 50 of the alternative embodiment are identical in other respects to the auger segments 12, and also exhibit end-for-end symmetry and may be linked together end-to-end about a main shaft to comprise an auger. The raised, half-annual sections of auger segments 12 do resist, however, relative rotational displacement of adjacent auger segments, thereby permitting a main shaft of reduced torsional stiffness to be used.

Although the invention has been described with respect to a preferred embodiment, it is to be understood that it is not to be so limited since changes can be made therein which are within the full intended scope of this invention as defined in the following claims.

I claim:

1. A segmented auger comprising:
    a. a plurality of auger segments including
        i. a central longitudinal hollow hub, ii. a longitudinal extension at each end of said hub, iii. helical flighting on said hub extending from said extension at one end of said hub to the extension at the other end of said hub, iv. beveled end portions on ends of said helical flighting each portion including a radial edge at an obtuse angle and a radial edge at an acute angle supplementary to said obtuse angle wherein said beveled end portion tapers from said obtuse edge to said acute edge, and v. whereby said beveled end portion twists relative to the longitudinal axis of said hub from being substantially aligned with the longitudinal axis near said hub to being at an increasing angle to the longitudinal axis at an increasing distance from said hub; and b. a drive shaft about which said plurality of said auger segments are assembled end-to-end to provide a substantially smooth and continuous helical flighting surface.

2. The auger as defined in claim 1, wherein said auger segments have end-for-end symmetry.

3. The auger as defined in claim 1, wherein:

a. said beveled end portions taper in the direction of the pitch of said helical auger.

4. A segmented auger having auger segments comprising:

a. a tubular hub;

b. a substantially semi-circular longitudinal extension at each end of said hub;

c. a pair of coplanar abutment surfaces at the edges of said extensions, one facing in a clockwise direction of rotation and the other facing in a counterclockwise direction of rotation;

d. helical flighting on said hub extending from the counterclockwise facing abutment surface at one end of said hub to the clockwise facing abutment surface at the other end of said hub;

e. beveled end portions on ends of said helical flighting; and f. whereby said beveled end portion is substantially parallel to the longitudinal axis of said hub near said hub and twists at an increasing angle to the longitudinal axis of said hub at an increasing distance from said hub.

5. The auger as defined in claim 4, wherein:

a. said pair of abutment surfaces at each end of said hub define a longitudinal plane of said hub.

6. The auger as defined in claim 4, wherein:

a. a plurality of said auger segments are aligned end-to-end and coaxially whereby said beveled end portion of one of said auger segments matches to create a lap joint with a beveled end portion of an adjacent auger segment to provide a substantially smooth and continuous helical flighting surface over the length of the auger; and b. a main shaft which inserted into said hollow hubs of said aligned plurality of auger segments to operatively link said segments and said main shaft.

7. The auger as defined in claim 6, wherein:

a. at least one of the pairs of abutment surfaces of one of said plurality of auger segments abut a pair of said abutment surfaces of an adjacent auger segment.

8. The auger as defined in claim 6, wherein:

a. the transverse cross section of said main shaft is a regular hexagon.

9. A segmented auger, comprising:

a. a plurality of auger segments including i. a central longitudinal hollow hub, ii. helical flighting on said hub extending from one end of said hub to the other end of said hub, iii. beveled end portions on ends of said helical flighting, each portion including an edge along a first radial line of said hub at an obtuse angle and an edge along a second radial line of said hub at an acute angle supplementary to said obtuse angle wherein said beveled end portion tapers from said obtuse edge to said acute edge, and iv. whereby each of said beveled end portions is substantially parallel to the longitudinal axis of said hub and twists at an increasing angle to the longitudinal axis of said hub at an increasing distance from said hub;

b. a drive shaft about which said plurality of said auger segments are assembled end-to-end to provide a substantially smooth and continuous helical flighting surface.

10. The auger as defined in claim 9, wherein:

a. said ends of said hub have one or more longitudinally extended sections and corresponding recessed sections to permit said ends of adjacent auger segments to mate when assembled to form the auger so as to provide a substantially smooth and continuous outer periphery of said hubs about said shaft.

11. A segmented auger, comprising:

a. a tubular hub;

b. a substantially semicircular longitudinal extension at each end of said hub;

c. a pair of coplanar abutment surfaces at the edges of said extensions, one facing in a clockwise direction of rotation and the other facing in a clockwise direction of rotation;

d. helical flighting on said hub extending from the counterclockwise facing abutment surface at one end of said hub to the clockwise facing abutment surface at the other end of said hub;

e. beveled end portions on ends of said helical flighting, each portion including an edge along a first radial line of said hub at an obtuse angle and an edge along a second radial line of said hub at an acute angle supplementary to said obtuse angle wherein said beveled end portion tapers from said obtuse edge to said acute edge, and f. whereby each of said beveled end portions is substantially parallel to the longitudinal axis of said hub and twists at an increasing angle to the longitudinal axis of said hub at an increasing distance from said hub.

* * * * *